Sept. 8, 1970  J. J. BUSSGANG  3,527,885
DATA COMPACTION SYSTEM WITH STAGGERED SCANNING
AND ADAPTIVE REDUNDANCY REMOVAL
Filed May 1, 1967  3 Sheets-Sheet 1

INVENTOR
JULIAN J. BUSSGANG
BY
COOCH AND O'CONNELL
ATTORNEYS

Sept. 8, 1970   J. J. BUSSGANG   3,527,885
DATA COMPACTION SYSTEM WITH STAGGERED SCANNING
AND ADAPTIVE REDUNDANCY REMOVAL
Filed May 1, 1967                            3 Sheets-Sheet 2

INVENTOR
JULIAN J. BUSSGANG

BY  COOCH AND O'CONNELL
ATTORNEYS

United States Patent Office 3,527,885
Patented Sept. 8, 1970

3,527,885
DATA COMPACTION SYSTEM WITH STAGGERED SCANNING AND ADAPTIVE REDUNDANCY REMOVAL
Julian J. Bussgang, Lexington, Mass., assignor to Signatron, Inc., Lexington, Mass., a corporation of Massachusetts
Filed May 1, 1967, Ser. No. 635,088
Int. Cl. H04b 1/66; H04j 3/18; H04n 7/12
U.S. Cl. 178—6.8                                                14 Claims

ABSTRACT OF THE DISCLOSURE

A data compaction system in which data concerning an image is selected in accordance with a prescribed two-dimensional curvilinear scanning path and such data is thereupon supplied to a suitable bandwidth compression means, such as an adaptive redundancy removal system, for producing a data compacted output information signal which can then be transmitted by a transmitting signal having a considerably reduced bandwidth.

---

This invention relates generally to data compaction systems for handling data concerning an information-containing image and, more particularly, to novel data selection means for use in such systems for producing improved operation thereof so that the amount of data required to be handled by such system in order to reproduce such information is substantially reduced.

Presently available data compaction systems make use of several different techniques in an effort to transmit a maximum amount of information with a minimum amount of data. Schemes for reducing the amount of output data derived from input information and, consequently, the rate at which said data must be transmitted or received in order to reproduce such input information can provide improved economic operation of the overall system either by reducing the bandwidth of the data handling signal previously needed to carry equivalent information or by providing for the transmission of a greater amount of information for the same bandwidth. Known data compaction or bandwidth compression schemes make use of the broad assumption that adjacent data points on an information-containing image which is being scanned by a conventional interlaced, linear electron beam pattern have informational values which tend to be substantially the same. Under this assumption, such systems can avoid the transmission of redundant data by transmitting data only when the information contained in such image changes significantly.

For example, an electron beam can be used to scan an information-containing image in a typical interlaced pattern of straight lines in order to produce a varying voltage read-out signal representative of the varying intensity of such scanned input image information. One typical bandwidth compression system, for example, provides an output voltage signal having a specified value in response to such an input read-out signal. So long as the varying value of the input signal remains within prescribed upper and lower limits about such specified value, no new output signal is produced. As soon as the voltage level of the input read-out signal (such level representing the intensity level of the image) exceeds such prescribed limits, the bandwidth compression system produces a new output signal having a new specified value, the same upper and lower limits then being prescribed about such new value. Thus, redundant information (i.e., information that remains within the preselected limit values or, in a special case, at a single value) need not be continuously produced at the output of the data compaction system and no new data is produced until such limits are exceeded or until such single value changes to a new value level.

Such systems are often generally designated as "adaptive redundancy removal" systems which terminology, as used herein, will refer to means for producing an output signal only when the input signal to such means deviates from a value within a prescribed set of limits, which limits are maintained at preselected values or which vary in a preselected manner over a limited range. Such systems, although not limited thereto, may take the form of presently known "floating-aperture predictor" systems, "zero-order interpolator" systems, or "fan-interpolator" systems, all of which are described, for example, in the article "Analytic Comparison of Adaptive Redundancy Removal Bandwith Compression Techniques," L. Ehrman, Proc. IEEE, vol. 55, No. 3 of March 1967. Such systems as presently known and used are provided with an input read-out signal which has been obtained by utilizing well-known scanning techniques wherein an electron beam scans an information-containing image in a conventional linear, interlaced scanning pattern. The use of such systems takes advantage of the high correlation that exists between the intensity values of an information-containing image along a horizontal straight-line path and, as discussed in the above-referenced article, the use of such systems can, under certain conditions, bring about a considerable reduction in the bandwidth required for the transmission of information.

This invention provides a further improvement in the data reduction capabilities of adaptive redundancy removal systems so that even greater bandwith compressions can be achieved. The system of my invention takes advantage of the fact that a high correlation exists between the intensity values of an information-containing image not only along a horizontal, straight-line path (a one-dimensional or "line" correlation) but in all directions (a two-dimensional or "area" correlation). Improved operation based on such an area correlation principle is attained by using a unique data selection technique which in one particular embodiment of the invention may take the form of a unique two-dimensional or area scanning electron beam pattern. In such system the voltage levels of successive portions of such beam read-out signal correspond to image intensity levels within successive areas of said image.

As indicated above, in such embodiment appropriate operation of the system can be obtained by the use of a unique electron beam scanning pattern wherein such beam is moved along a two-dimensional, curvilinear scanning path. By using such a path the level of the voltage read-out signal derived from such beam remains within the preselected limits of the system (i.e., the two-dimensional correlation of intensity values for such read-out signal along the scanning path remains high) over a much longer portion of the scanning path than it does in presently used linear, interlaced beam scanning systems. The scanning path of such an embodiment may be thought of as a two-dimensional or "area" scan pattern as opposed to the one-dimensional or "line" pattern presently used. The latter more conventional scanning system depends only upon the maintenance of a relatively high correlation between the intensities of successive data points only along a horizontal, straight-line path, such correlation decreasing below useful limits relatively rapidly. Because the area scan pattern depends on a two-dimensional correlation, the intensity of the scanning voltage read-out signal tends to remain within its preselected limits (i.e., its correlation remains high) over a much longer scanning path.

An alternative embodiment of the invention also dependent upon the "area" correlation principle may use a conventional linear scan pattern. In such embodiment the scanning beam read-out signal is appropriately stored so that certain data portions thereof corresponding to the intensity levels of successive areas of the scanned image along a prescribed two-dimensional curvilinear path can be subsequently selected to produce a voltage output signal representing such intensity levels. The selection of appropriate data points corresponding to the image intensity levels along such path, thus, takes advantage of the two-dimensional nature of the intensity correlation.

The combination of such unique data selection schemes with appropriate adaptive redundancy removal means as discussed above, provides a novel overall data compaction scheme which offers greatly improved operation over known data compaction schemes available at the present time.

The operation of the scanning system of the invention and its use in an overall data handling system is described in more detail with the help of the following drawings in which.

Figure 1:
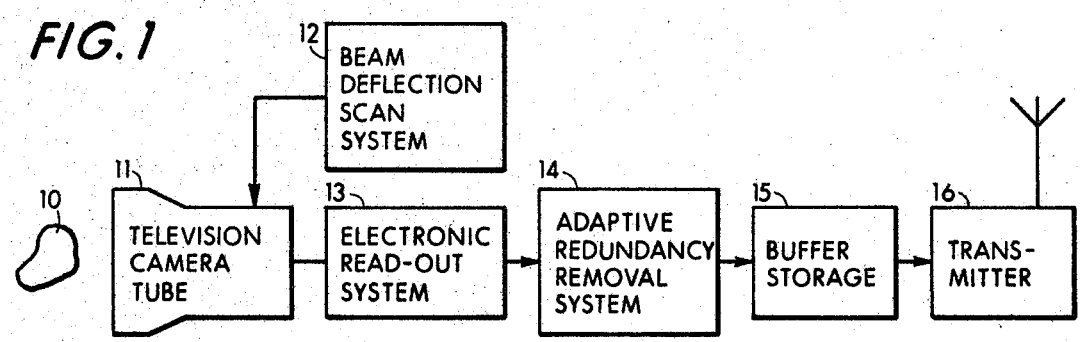
FIG. 1 shows block diagrams of a transmitting system in which the invention can be used.

FIG. 1 shows a block diagram of an overall data transmission system for transmitting information concerning an image source 10 which, for example, may be a live scene, a photograph, a black and white picture, a line-drawing, or other information-containing image, which is being viewed by an appropriate image scanning system. In the embodiment shown, such scanning system includes a television camera tube 11 utilizing scanning means, such as an electron beam, for producing a variable voltage read-out signal responsive to the varying intensity of the information-containing image as it is being scanned. Although not necessarily limited thereto, such a system may be most useful in a situation where the information-containing image is essentially fixed or is changing relatively slowly. For example, the invention may be used in facsimile transmission systems, where information concerning a fixed image is transmitted for reproduction at one or more remote receiver points, or in satellite communication systems, where relatively fixed scenes are scanned and the output information signal is ofen required to be stored for transmission at specified times to one or more earth-bound stations. Other suitable applications will occur to those skilled in the art within the scope of the invention.

FIG. 1, a beam deflection scan system 12 produces an appropriate read-out signal at the output of an electronic read-out apparatus 13, the voltage value of such read-out signal depending on the intensity level of the beam as it scans information-containing image 10. In a conventional scan system the beam is deflected in a linear scan pattern wherein the beam scans the image along a path formed by the well-known pattern of interlaced horizontal lines as commonly used in television transmission reception.

The amount of data required for the transmission of sufficient information to reproduce the scanned image, may be reduced by applying the voltage signal output from electronic read-out system 13 to an adaptive redundancy removal system 14 of the general type discussed above. In order to provide a better understanding of the invention, the operation of one particular type of adaptive redundancy removal scheme is described in more detail with reference to FIG. 2. The compacted data can then be immediately transmitted or stored in a suitable buffer storage system 15 for subsequent transmission by any well-known signal transmitter 16.

Figure 2:
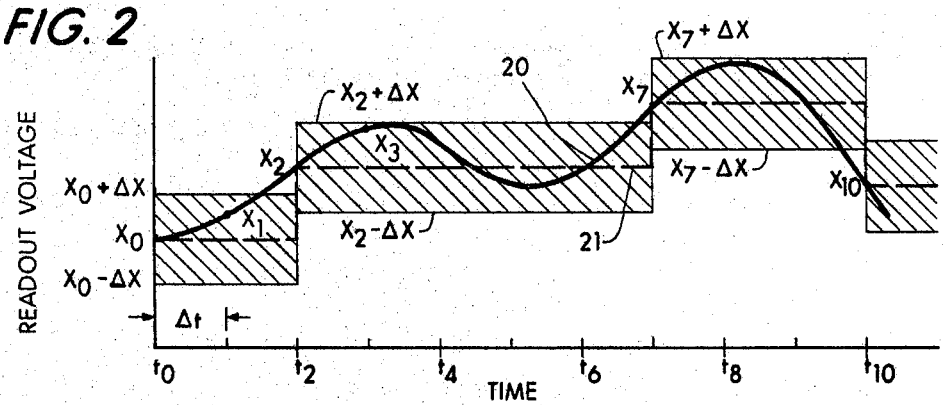
FIG. 2 shows a graph including curves representing a beam read-out signal and an approximation thereof obtained by the use of a floating-aperture predictor type of adaptive redundancy removal system.

As indicated above, a typical adaptive redundancy removal system may be of the "floating-aperture predictor" type as described in the above-referenced article of Ehrman and summarized here with reference to FIG. 2. As shown in that figure, such a predictor system can be used to produce at its output a signal containing information for approximating a variable voltage input signal designated by a curve 20, for example, which represents a portion of a typical read-out signal from read-out system 13 of FIG. 1. The floating-aperture predictor provides for a discrete sampling of the amplitude of the read-out signal (which represents the beam intensity as it scans the image) at fixed time intervals designated in the graph of FIG. 2 by the times $t_0, t_1, t_2$ . . . etc. The floating-aperture predictor system is arranged to provide an initial sampled output signal at reference time $t_0$ having a value equal to the initial voltage value $X_0$ of curve 20 shown in FIG. 2 as having been appropriately sampled at time $t_0$. So long as the discretely sampled voltage values of curve 20 remain within preselected upper and lower limits about the initial value $X_0$, such preselected limits being designated in FIG. 2 as $X_0+\Delta X$ and $X_0-\Delta X$, the predictor system does not produce a subsequent sampled output signal. Thus, at the next sampling time $t_1$, the voltage value $X_1$ of curve 20 is still within such preselected limits and no output signal occurs.

At the next sampled time $t_2$, the voltage value of curve 20 is at $X_2$, which value falls outside the limits $X_0 \pm \Delta X$. At that time the floating-aperture predictor system produces a sampled output signal having a new value of $X_2$ and the prescribed limits now become $X_2 + \Delta X$ and $X_2 - \Delta X$.

In the specific example shown in FIG. 2, the value of read-out voltage curve 20 remains within such limits at the next four sample times $t_3, t_4, t_5$ and $t_6$ and only falls outside the preselected limits at sample time $t_7$. At that time the floating-aperture predictor system produces a sampled output signal having a new value of $X_7$ and the limits now become $X_7+\Delta X$ and $X_7-\Delta X$. Such a sampling process is carried out for the overall curve so that the original voltage curve 20 can, upon suitable reconstruction as discussed below, be thereby approximated by the stair-step curve shown by dashed line 21.

In such a system the accuracy with which the original curve is reproduced depends upon the width $\Delta X$ of the preselected upper and lower limits (the value $2\Delta X$ is a measure of the overall "aperture") and the width $\Delta t$ of the sampled time interval. Thus, the smaller the values of $\Delta X$ and/or $\Delta t$, the more accurate the approximation of the output signal to the original input signal.

Such a floating-aperture predictor represents only one specific, known technique which can be used for the adaptive-redundancy removal system 14 of the overall transmission system of FIG. 1. Other examples of redundancy removal techniques may occur to those skilled in the art and may include, for example, the zero-order interpolator and fan-interpolator, each described in more detail in the above referred-to article of Ehrman, or the so-called "run-length encoding" techniques as described, for example, in the article "An Experimental Study of the Possible Bandwidth Compression of Visual Image Signals," C. Cherry et al., Proc. IEEE, vol. 51, No. 1 of November 1963.

As can be seen by the operation of the floating-aperture predictor, the amount of data required to be transmitted is reduced considerably from that which would be required if each of the data values produced at each sampled time is transmitted. Only data obtained at those times when the value of the input read-out signal changes significantly (i.e., when it falls outside the preselected aperture limits) need be used. Thus, in the specific example shown in FIG. 2, data concerning amplitude and time need only be obtained from the floating-aperture predictor at times $t_0$, $t_2$, $t_7$ and $t_{10}$ (i.e., when the data value exceeds the selected aperture width), rather than at each time interval $t_0$, $t_1$, $t_2$, $t_3$ . . . etc. Such data which is thereby obtained at a substantially non-uniform rate can be either directly transmitted or, preferably as shown, it can be stored in a suitable buffer storage system 15 from which it is subsequently extracted for transmission by transmitter 16 at a uniform rate which is lower than the original sampling rate.

Data compaction can be achieved in the above-described system even with a standard line-by-line scan pattern because the voltage values at adjacent points along the curve 20 (such values corresponding to adjacent values of the intensity of the beam along each horizontal line as it scans the image) generally tend to have some degree of correlation and, thus, tend to remain within the preselected limits along segments of the linear scanning path. Such a scheme, however, only takes advantage of a one-dimensional correlation (i.e., along a horizontal straight line) and the correlation may tend to deteriorate relatively rapidly.

My invention, on the other hand, produces improved data compaction, such improvement being obtained in one particular embodiment by utilizing a two-dimensional, curvilinear scanning path rather than the standard line-by-line, interlaced scanning pattern previously used. Thus, the invention takes advantage of the fact that the intensity of the image tends to remain within preselected limits for adjacent data points in any direction, i.e., the correlation of the intensities of adjacent data values does not depend on the direction of the path along which the scanning beam proceeds. Because a linear scan inherently examines intensities only in one direction (a one-dimensional scan), it cannot, of itself, take full advantage of the two-dimensional nature of such correlation.

The operation of such an embodiment of the invention utilizing a two-dimensional scanning pattern can be described with the help of FIGS. 3-6 which figures are useful in discussing typical embodiments of the unique scanning patterns used therein.

Figure 3A:
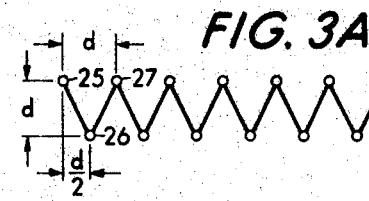
FIG. 3A shows a graphical representation of one embodiment of an area scanning pattern of the invention.
Figure 3B:
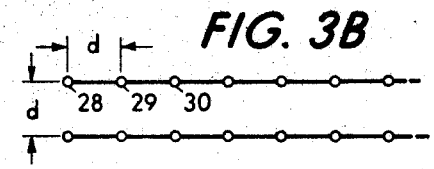
FIG. 3B shows a graphical representation of a conventional linear scanning pattern.

For example, FIG. 3A shows essentially a "two-line zig-zag" scanning pattern representing one useful embodiment of a scanning system of the invention. Such scanning pattern can be compared to a conventional linear scan pattern as shown in FIG. 3B. In the pattern of FIG. 3A, let us assume that a first beam intensity value is obtained at time $t_0$ at an initial scanned data point 25 on an information-containing image. The beam then proceeds to scan such image in the direction shown by the arrow until a scanned data point 26 is reached at a time $t_1$ in the scanning pattern. Data point 26 is located on what normally would have been the second interlaced line of the standard line-by-line scanning pattern of FIG. 3B, which line is indicated in FIG. 3A as being at a distance $d$ from the line on which initial data point 25 lies. The beam scan pattern then proceeds in the direction shown by the arrow until it reaches another scanned data point 27 at a time $t_2$ in the scan pattern. Data point 27 is located at a distance $d$ from initial data point 25 along the original line on which the latter data point is located. Data point 26 is midway between data points 25 and 27 as shown. Such zig-zag pattern is repeated as the scanning beam is moved from left to right across the image in the direction of the arrows.

Figure 4A:
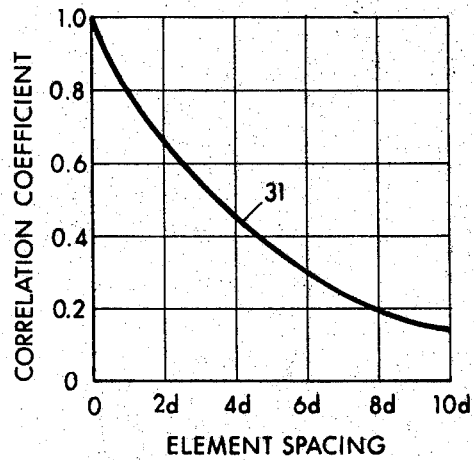
FIG. 4A shows a graph of an arbitrarily selected curve depicting the correlation of intensities between data points as a function of the distance between such points.
Figure 4B:
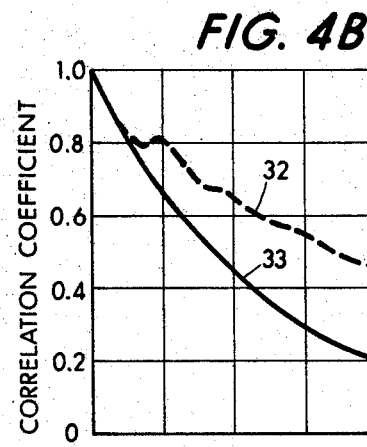
FIG. 4B shows a graphical comparison of the correlations obtained by the scanning patterns of FIGS. 3A and 3B.

In order to explain the advantages of the scanning pattern shown in FIG. 3A as opposed to the linear scanning pattern of FIG. 3B, the graphs of FIGS. 4A and 4B are helpful. For purposes of illustration, FIG. 4A shows an arbitrarily selected, but generally representative, curve 31 representing the value of the correlation coefficient between any two data points as a function of the distance between such points. Thus, a correlation coefficient of 1.0 indicates that the intensities at such points have a 100% probability of being the same. For the assumed correlation curve 31, such correlation occurs only if the two data points under consideration coincide (i.e., the spacing between them is equal to zero). As the spacing between any two data points increases, the chances that such data points will have the same intensity decreases (i.e., the correlation coefficient decreases). For the assumed curve 31, for example, the correlation coefficient of the intensities at data points separated by the distance $d$ is equal to .81, the correlation coefficient at data points separated by the distance "$2d$" is equal to .66 . . . etc.

For the two-line zig-zag pattern shown in FIG. 3A, a curve 32 of the correlation coefficient between the initial intensity value at an initial data point 25 and the intensity values for succeeding data points along the zig-zag path is shown in FIG. 4B. Such curve has been obtained by calculating the distances between data point 25 and each of a plurality of succeeding data points along the scanning path. For purposes of calculation such succeeding data points have been selected as points 26, 27 . . . etc. lying at the points where the scanning pattern changes its direction. The correlation coefficient values between data point 25 and each of said succeeding data points can then be determined from curve 31 of FIG. 4A. Thus, a calculated curve of the correlation coefficient for the two-dimensional, curvilinear scanning pattern of FIG. 3A is shown as dashed-line curve 32 of FIG. 4B. Curve 32 can be compared with the correlation coefficient curve for the conventional straight-line scanning pattern of FIG. 3B, shown as curve 33 in FIG. 4B. The latter curve is obviously the same as that of assumed correlation coefficient curve 31 of FIG. 4A.

As can be seen in FIG. 4B, the correlation coefficient curve 32 for the two-line zig-zag pattern of FIG. 3A remains relatively higher over a longer portion of the scanning path than the correlation coefficient curve 33 for the straight-line path of FIG. 3B. Wherein data points 28, 29, 30 . . . etc. are obtained along a straight-line by the scanning system.

Figure 5A:
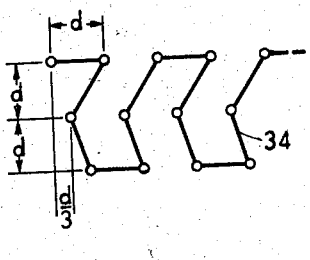
FIG. 5A shows a graphical representation of an alternate embodiment of an area scanning pattern of the invention.
Figure 6A:
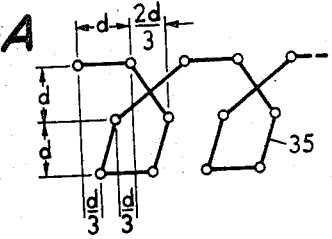
FIG. 6A shows a graphical representation of another alternate embodiment of an area scanning pattern of the invention.
Figure 5B:
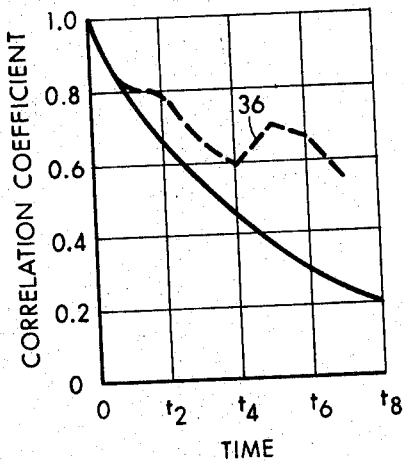
FIG. 5B shows a graphical comparison of the correlation obtained by the scanning patterns of FIGS. 5A and 3B.
Figure 6B:
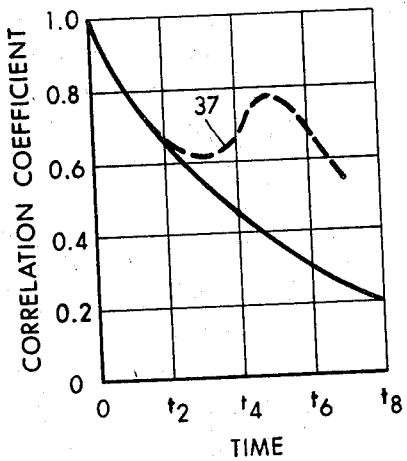
FIG. 6B shows a graphical comparison of the correlations obtained by the scanning patterns of FIGS. 6A and 3B.

FIGS. 5A and 6A show alternate embodiments of two-dimensional scanning patterns which can be utilized in the invention. Such curves designated as curves 34 and 35, respectively, are "three-line" patterns as opposed to the two-line pattern of FIG. 3A. FIGS. 5B and 6B show a comparison of correlation coefficient curves 36 and 37, respectively, for such patterns with the corresponding dashed-line curve for the one-dimensional, straight-line pattern.

Thus, as can be seen in FIGS. 4B, 5B and 6B, a considerable improvement in the overall operation of the system shown in FIG. 1 can be obtained since the value of the read-out voltage signal tends to remain within prescribed limits for a much longer portion of the scanning path than was previously the case with a standard, line-by-line scan pattern and data compaction is thereby considerably enhanced.

Figure 7A:
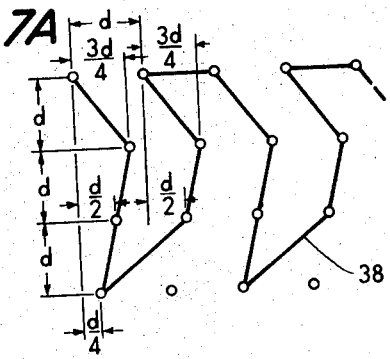
FIG. 7A shows a graphical representation of another alternative embodiment of an area scanning pattern of the invention.
Figure 7B:
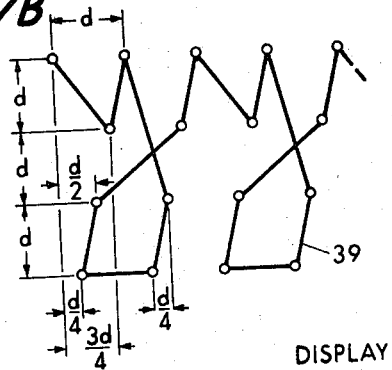
FIG. 7B shows a graphical representation of another alternative embodiment of an area scanning pattern of the invention.

If the line-to-line correlation is expected to remain relatively high over more than three lines, scanning patterns involving four lines, or even more, can be used. Two examples of appropriate four-line scanning patterns are shown as curves 38 and 39 in FIGS. 7A and 7B, respectively. Other pattern configurations which lie within the scope of the invention can be devised to extend to as many lines as may prove feasible and practicable for the particular applications in which the invention may be found useful.

An indication of the comparative improvement obtained from the system of the invention over a standard one-dimensional linear scan system can be seen if reference is made to the concept of a "resolution element" of the information-containing image which is being scanned. Such a resolution element may be defined as the smallest elemental portion of an information-containing image which is capable of being distinguished or resolved by an electron beam of a specified beam width as it scans said image. For purposes of this discussion, the distance between such resolution elements will be referred to as the "resolution distance" which is usually approximately equal to the distance $d$ between the lines of a conventional, linear scanning pattern.

Let us assume that in such a one-dimensional linear scan system the intensity of the scanning beam tends to remain within certain specified and preselected limits over a scanning path length containing $n$ resolution elements. In a two-dimensional curvilinear scanning system of the invention the intensity of the scanning beam will tend to remain within the same preselected limits over a scanning path length which may contain a number of resolution elements up to a limit as high as approximately $n^2$ elements. Such a result can be intuitively confirmed if one realizes that the two-dimensional scanning pattern represents an "area scan" in contrast to the conventional "line scan" system.

Figure 8:
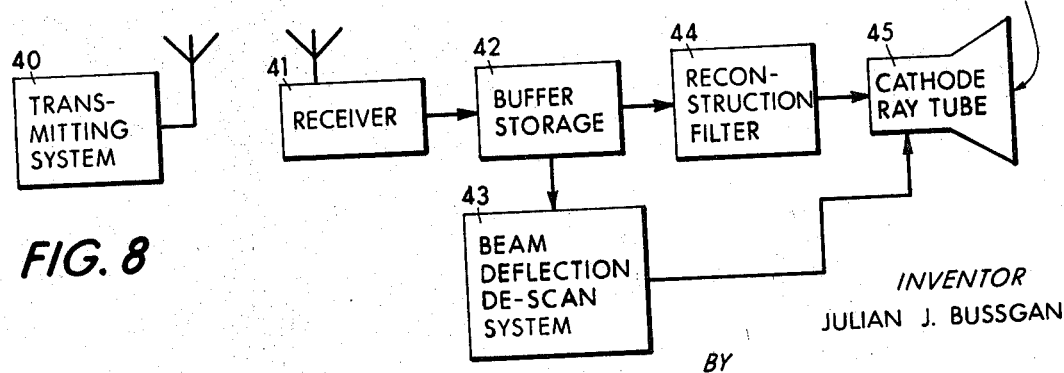
FIG. 8 shows a block diagram of a receiving system with which the invention can be used.

An overall communications system which includes the transmitter system shown in FIG. 1 and which uses the improved two-dimensional scanning pattern system of the invention is shown in FIG. 8. In that figure the transmitting system 40 may be essentially of the form shown in the embodiment of FIG. 1 in which the beam deflection scan system 12 is of the two-dimensional, curvilinear type. A conventional receiver element 41 receives the data compacted signal transmitted from the transmitter system 40 and feeds such signal into a suitable buffer storage system 42. The incoming transmitted signal includes as a part thereof a suitable timing signal for controlling the actuation of a scanning pattern generator for an appropriate display device, such as a cathode ray receiving tube 45. Such a timing signal actuates a beam deflection de-scan system 43 which causes the electron beam to scan the face of the receiving tube in accordance with the same pattern as that used with reference to the transmitting system so that the receiver scanning pattern is synchronized therewith by the timing signal. The received, data-compacted signal stored in buffer storage system 42 is supplied to a suitable reconstruction filter 44 which reconstructs the information contained therein by providing an output voltage signal in accordance with the stair-step approximation corresponding to curve 21 of FIG. 2, for example, as derived from the data compacted signal generated by the adaptive redundancy removal system of transmitter 40. The output of reconstruction filter 44, thus, is used to control the intensity of the electron beam on the display screen of tube 45 in accordance with such reconstructed output signal so that an approximate reproduction of the original image at image source 10 is obtained at the screen of display tube 45. As indicated above, the accuracy of such reproduction depends on the selection of the sampling time interval $\Delta t$ and the aperture width $\Delta X$ of the particular adaptive redundancy removal system which is used in transmitter 40.

Although the system of the invention has been described above for use in scanning an image whose intensity level may vary over a relatively wide range, it is clear that such a system may be particularly useful when the intensities of the image being scanned assume only two, or a few specific values. For example, in a black and white picture of high contrast where essentially only two values of intensity exist (i.e., the intensity is either at a "white" level or at a "black" level), signal redundancy may be removed by transmitting only information concerning the path length of sequences of equal intensity signals. Such a technique in which information concerning such path length, or the end positions thereof in which the intensity level changes from one value to the other, is commonly called run length encoding. Conventional run length encoding is performed along each scanned line of a visual picture and, as mentioned above, is described in the above referred-to article by Cherry et al. It is clear that the system of the invention is equally well adapted to run length encoding and should result in even better data compaction than was possible before in using such techniques.

Figure 9:
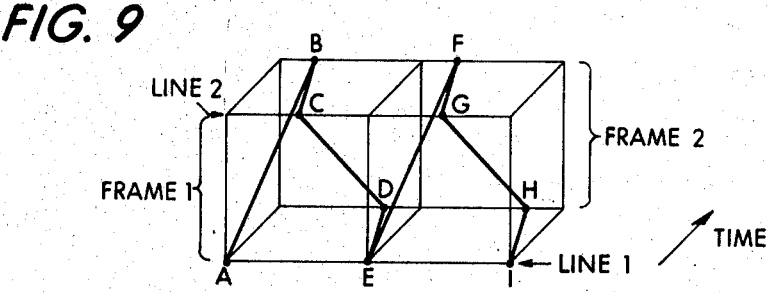
FIG. 9 shows a graphical representation of an alternative embodiment of a volume scanning pattern of the invention.

The "area-scan" principle may be extended further to a principle of "volume-scan" if time is considered as a third dimension. In FIG. 9 advantage is taken of the frame-to-frame correlation involved in transmitting multi-frame information so that the principles used for a two-line area scan can be adapted, for example, to a two-line, two-frame volume scan. In such an embodiment data points may be selected in accordance with a selected pattern such as that shown by the pattern formed by data points A through I in the figure. In this way data compression with regard to moving images can be achieved.

It should be noted that the invention operates in accordance with two important principles. First of all, the content of the picture image does not control the scan pattern which is used except as to the number of lines and frames which are to be scanned. Secondly, the best results are preferably obtained not with a selection of data points which form a rectangularly aligned grid pattern but with a generally staggered type of grid pattern of data points as depicted in FIGS. 3A, 5A, 6A, 7A and 7B.

Figure 10A:
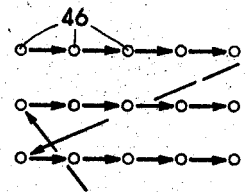
FIG. 10A shows a graphical representation of the sequence in which a plurality of data points is obtained from a conventional linear scanning system.
Figure 10B:
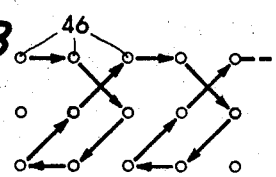
FIG. 10B shows a graphical representation of a sequence in which the data points of FIG. 10A can be rearranged to provide an equivalent area scan.

The principles of the invention as mentioned above can also be applied to data which is obtained from a conventional horizontal, straight-line beam scanning pattern, and thus, for example, the system can be used for the retransmission of conventionally scanned pictures, if an appropriate intermediate storage and retrieval system in the form, for example, of a suitable digital computer is used to rearrange the data points obtained in accordance with a two-dimensional pattern. For example, as shown in FIG. 10A, a plurality of data points 46 may be obtained by the use of a conventional, interlaced linear scanning pattern in the sequence shown by the arrows may be stored in a computer. The computer may then be programmed to produce an output signal representative of the intensity levels of a plurality of such data points which have been selected in accordance with a two-dimensional curvilinear pattern as shown by the sequence of the arrows in FIG. 10B. While the data points obtained in the pattern of FIG. 10B are essentially vertically aligned, a possible refinement of this technique can be used to obtain a non-aligned pattern. For example, the estimated intensity levels at appropriately selected points between the horizontally aligned data points can be effectively obtained through well-known interpolation techniques so that the stored data information can be rearranged in accordance with a two-dimensional pattern in which the selected data points have a non-aligned or staggered relationship in the vertical direction. Such staggered pattern may be generally equivalent, for example, to those shown in the patterns of FIGS. 3A, 5A, 6A, 7A and 7B.

Figure 11:
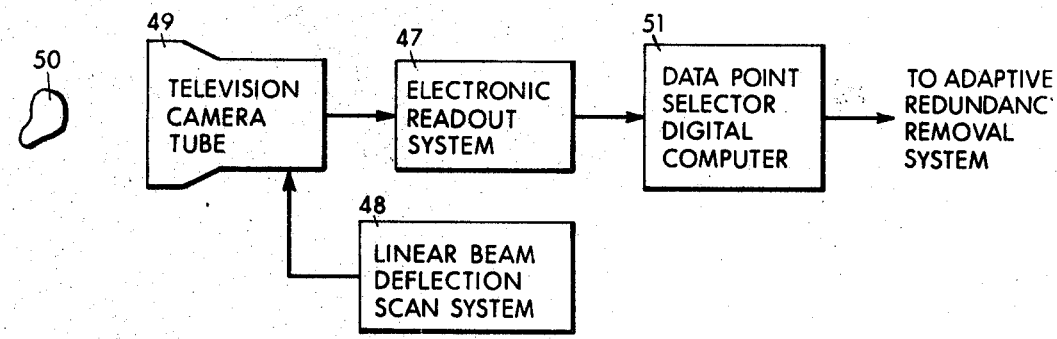
FIG. 11 shows a block diagram of an alternative embodiment of the system of the invention which can provide for the rearranged sequence of FIG. 10B.

Thus, whichever method is used, the programmed selection of data points forms the equivalent of the two-dimensional scanning patterns discussed above with reference to FIGS. 3 through 7. The block diagram of FIG. 11 shows a simple embodiment of such an alternative data selection system. The appropriate digital computer techniques required for making a selection of such data points is well within the skill of those in the art and need not be discussed in detail here. As shown in FIG. 11 the output of electronic read-out system 47 as determined by a linear beam deflection scan system 48 applied to television camera tube 49 viewing an image 50 is applied to a data point selector digital computer 51. The output from computer 51 is then fed to an appropriate adaptive redundancy removal system of the type discussed above with reference to FIG. 1. The system of FIG. 11, for example, is particularly adaptable for producing an equivalent multi-dimensional scan pattern discussed with reference to FIG. 9.

Other modifications or alternative embodiments of the invention may occur to those skilled in the art without departing from the spirit and scope of the invention. Hence, the invention is not to be construed to be limited to the particular embodiment described herein except as defined by the appended claims.

What is claimed is:

1. A system for handling information concerning an image, said system comprising, in combination,
    data selection means for obtaining data corresponding to the intensity levels of said image along a prescribed multi-dimensional scanning path passing through a plurality of points selected to form a staggered grid pattern, said path moving substantially linearly between said points and the direction of travel of said path changing at each said point, said data selection means thereby producing a signal representing said intensity levels, and
    adaptive redundancy removal means responsive to said data selection means for producing an output information signal concerning said image.

2. A system for handling information concerning an image in accordance with claim 1 wherein said path is a two-dimensional scanning path.

3. A system for handling information concerning an image in accordance with claim 2 and further including
    means responsive to said adaptive redundancy removal means for transmitting said data compacted output information signal, and
    means for receiving said transmitted signal and for displaying a reproduction of said image in accordance with said data compacted output information signal.

4. A system for handling information concerning an image in accordance with claim 3 wherein said receiving means includes
    means for reconstructing the information contained in said data compacted signal; and
    display means for visually displaying said reconstructed information.

5. A system for handling information concerning an image in accordance with claim 4 wherein said display means includes
    a display screen;
    an electron beam deflection system; and
    synchronizing means for causing said electron beam to scan said display screen in accordance with said prescribed two-dimensional curvilinear scanning path.

6. A system for handling information in accordance with claim 1, wherein said data selection means includes
    means for scanning said image along said prescribed two-dimensional path; and
    means responsive to said scanning means for producing a signal representing the intensity levels of said image along said path.

7. A system for handling information concerning an image in accordance with claim 6 wherein said scanning means includes
    means for porducing an electron beam; and
    means for deflecting said electron beam so as to scan said image along said prescribed two-dimensional scanning path; and
    read-out means responsive to said beam for producing a signal representing the intensity levels of said image along said path.

8. A system for handling information concerning an image in accordance with claim 7 and further including
    means responsive to said adaptive redundancy removal means for transmitting said data compacted output information signal;
    means for receiving said transmitted signal;
    means responsive to said receiving means for reconstructing the information contained in said data compacted signal;
    display means for displaying said reconstructed information, said display means including scanning means and means for synchronizing said scanning means in accordance with said prescribed two-dimensional scanning path.

9. A system for handling information concerning an image, said system comprising, in combination, data selection means including
    means for scanning said image in a preselected pattern;
    means responsive to said scanning means for storing data concerning the intensity levels of said image as obtained from said scanning means;
    means responsive to said storing means for selecting data from said pattern, said data corresponding to the intensity levels of said image at a plurality of points selected to form a staggered grid pattern, and for producing a signal representing said intensity levels, and adaptive redundancy removal means responsive only to the intensity level signals at said staggered points produced from said data selection means for producing an output information signal concerning said image.

10. A system for handling information concerning an image in accordance with claim 9 wherein said preselected scanning pattern is formed by a plurality of straight lines.

11. A system for handling information concerning an image in accordance with claim 9 wherein said means for selecting data from said storing means comprises a digital computer programmed to select such data in accordance with said selected points.

12. A system for handling information concerning an image in accordance with claim 9 and further including
    means responsive to said adaptive redundancy removal means for transmitting said data compacted output information signal;
    means for receiving said data compacted signal;
    means responsive to said receiving means for reconstructing the information contained in said data compacted signal;
    means for displaying said reconstructed information, said display means including scanning means and means for synchronizing said scanning means to reproduce said information in accordance with said selected points.

13. A system for handling information concerning an image, said system comprising, in combination,
  data selection means for obtaining data corresponding to the intensity levels of said image along a prescribed multi-dimensional scanning path passing through a plurality of points selected to form a staggered grid pattern, said path moving substantially linearly between said points and the direction of travel of said path changing at each said point, said data selection means thereby producing a signal representing said intensity levels, and
  bandwidth compression means responsive to said data selection means for producing an output informational signal concerning said image.

14. A scanning system for producing information concerning an image, said scanning system comprising, in combination,
  means for scanning said image along a prescribed two-dimensional path passing through a plurality of points selected to form a staggered grid pattern, said path moving substantially linearly between said points and the direction of travel of said path changing at each said point; and
  means responsive to said scanning means for producing a signal representing the intensity levels of said image along said path.

References Cited

UNITED STATES PATENTS 2,921,124  1/1960  Graham.
3,239,606  3/1966  Chatten.

OTHER REFERENCES

Proceedings of the IEEE, TK5700, I7, vol. 55, No. 3, March 1967, "Study of an Adaptive Quantizer;" by L. S. Golding et al., pp. 293–297.

ROBERT L. GRIFFIN, Primary Examiner

H. W. BRITTON, Assistant Examiner

U.S. Cl. X.R.
179—15.55